United States Patent
Watanabe et al.

(10) Patent No.: US 9,200,573 B2
(45) Date of Patent: Dec. 1, 2015

(54) ACCELERATOR APPARATUS

(71) Applicant: DENSO CORPORATION, Kariya, Aichi-pref. (JP)

(72) Inventors: Hidekazu Watanabe, Aichi-gun (JP); Masahiro Makino, Kariya (JP); Takehiro Saito, Anjo (JP)

(73) Assignee: DENSO CORPORATION, Kariya (JP)

( * ) Notice: Subject to any disclaimer, the term of this patent is extended or adjusted under 35 U.S.C. 154(b) by 300 days.

(21) Appl. No.: 13/945,989

(22) Filed: Jul. 19, 2013

(65) Prior Publication Data

US 2014/0083394 A1 Mar. 27, 2014

(30) Foreign Application Priority Data

Sep. 26, 2012 (JP) .................................. 2012-212000
Jan. 24, 2013 (JP) .................................. 2013-11199

(51) Int. Cl.
*F02D 41/22* (2006.01)
*F02D 11/10* (2006.01)
*B60K 26/02* (2006.01)
*G01B 7/30* (2006.01)

(52) U.S. Cl.
CPC .............. *F02D 11/106* (2013.01); *B60K 26/02* (2013.01); *F02D 11/107* (2013.01); *F02D 41/22* (2013.01); *F02D 41/222* (2013.01); *G01B 7/30* (2013.01); *F02D 2400/08* (2013.01)

(58) Field of Classification Search
CPC ...... F02D 41/22; F02D 41/222; F02D 11/106
USPC ........ 123/399, 198 D, 480; 701/29.2, 70, 107
See application file for complete search history.

(56) References Cited

U.S. PATENT DOCUMENTS

| | | | | |
|---|---|---|---|---|
| 5,878,359 | A * | 3/1999 | Takeda | 701/29.2 |
| 2012/0221220 | A1* | 8/2012 | Yamazaki et al. | 701/70 |
| 2012/0291586 | A1 | 11/2012 | Watanabe et al. | |
| 2014/0145713 | A1* | 5/2014 | Watanabe et al. | 324/207.25 |

FOREIGN PATENT DOCUMENTS

| | | |
|---|---|---|
| JP | 6-74708 | 3/1994 |
| JP | 9-133030 | 5/1997 |
| JP | 2008-8233 | 1/2008 |
| JP | B2-4198544 | 10/2008 |
| JP | 4198544 B2 | 12/2008 |

* cited by examiner

*Primary Examiner* — Mahmoud Gimie
(74) *Attorney, Agent, or Firm* — Nixon & Vanderhye PC

(57) ABSTRACT

A rotation angle sensor detects a rotation angle of a pedal by its first Hall IC and second Hall IC, which are disposed between two magnets and output voltages varying with magnetic flux changes. When the rotation angle of the pedal is an accelerator full-closure rotation angle or more, the first Hall IC generates a first voltage V1, which is twice as large as a second voltage V2 of the second Hall IC. When the rotation angle is less than 0°, the first Hall IC fixes the first voltage irrespective of the rotation angle. An ECU determines that the rotation angle is abnormal indicating that the pedal rotates in an accelerator closing direction beyond an accelerator full-closure position, when an output difference G1 calculated as G1=V1/2−V2 is more than a predetermined value.

9 Claims, 12 Drawing Sheets

ACCELERATOR APPARATUS

CROSS REFERENCE TO RELATED APPLICATION

This application is based on and incorporates herein by reference Japanese patent applications No. 2012-212000 filed on Sep. 26, 2012 and No. 2013-11199 filed on Jan. 24, 2013.

FIELD

The present disclosure relates to an accelerator apparatus.

BACKGROUND

In an accelerator apparatus, which controls acceleration of a vehicle in accordance with an amount of operation on an accelerator pedal by a driver, a rotation angle sensor detects a rotation angle of the pedal. In the rotation angle sensor, plural magnetism detection devices, which rotate relatively to a magnetism generation device provided on a shaft, convert changes in magnetic density into voltages. The accelerator apparatus controls a valve opening angle of a throttle valve in accordance with a rotation angle of the pedal, which is calculated based on the converted voltages. For example, JP 4198544 (patent document) discloses an accelerator apparatus, which is provided with a battery voltage detection device and a sensor power voltage detection device. When power supplied to two magnetism detection devices falls, the accelerator apparatus prevents a throttle valve from being fully closed in response to a fall of the voltages outputted from the magnetism detection devices.

According to the patent document, it is checked whether the accelerator apparatus is operating normally based on a voltage difference calculated from the voltages outputted from the two magnetism detection devices. In an abnormal operation state of the pedal, in which the pedal rotates in an accelerator closing direction exceeding an accelerator full-closure angle corresponding to a full-closure state of the throttle valve, the voltage difference remains within a predetermined range. In this case, the accelerator apparatus is determined to be operating normally. As a result, the rotation angle of the pedal is not determined to be abnormal.

SUMMARY

It is an object to provide an accelerator apparatus, which is capable of determining an abnormality of a rotation angle of a pedal.

An accelerator apparatus comprises a support device attachable to a vehicle chassis, a shaft supported rotatably by the support device, an operation device fixed to the shaft and rotatable to rotate the shaft integrally, a biasing device for biasing the shaft in an accelerator closing direction, a magnetism generation device for generating magnetic flux, plural magnetism detection devices for respectively outputting plural voltages varying with a change in magnetic flux density, which is caused by relative rotation against the magnetism generation device when the operation device is rotated, and an abnormality check device for checking whether a rotation angle of the operation device, which decreases when the operation device rotates in the accelerator closing direction, based on the plural voltages outputted from the plural magnetism detection devices.

In one aspect, the plural magnetism detection devices include a first magnetism detection device and a second magnetism detection device for outputting a first output voltage and a second output voltage, respectively, based on a predetermined relational expression, which defines a relation between the first output voltage and the second output voltage when the rotation angle of the operation device is equal to or greater than a normal low limit value corresponding to a rest position of the operation device. The first magnetism detection device outputs the first output voltage, which is different from the predetermined relational expression, when the rotation angle of the operation device is less than the normal low limit value. The abnormality check device determines that the rotation angle of the operation device is abnormal when a voltage difference between the first output voltage and the second output voltage is outside a predetermined range.

In another aspect, the plural magnetism detection devices include a first magnetism detection device and a second magnetism detection device for outputting a first output voltage and a second output voltage, respectively, based on a predetermined relational expression, which defines a relation between the first output voltage and the second output voltage when the rotation angle of the operation device is equal to or greater than a predetermined rotation angle larger than a normal low limit value corresponding to a normal rest position of the operation device. The first magnetism detection device outputs the first output voltage, which is different from the predetermined relational expression, when the rotation angle of the operation device is less than the predetermined rotation angle larger than the normal low limit value. The abnormality check device determines that the rotation angle of the operation device is abnormal when a voltage difference between the first output voltage and the second output voltage is outside a predetermined range.

EMBODIMENT

Figure 1:
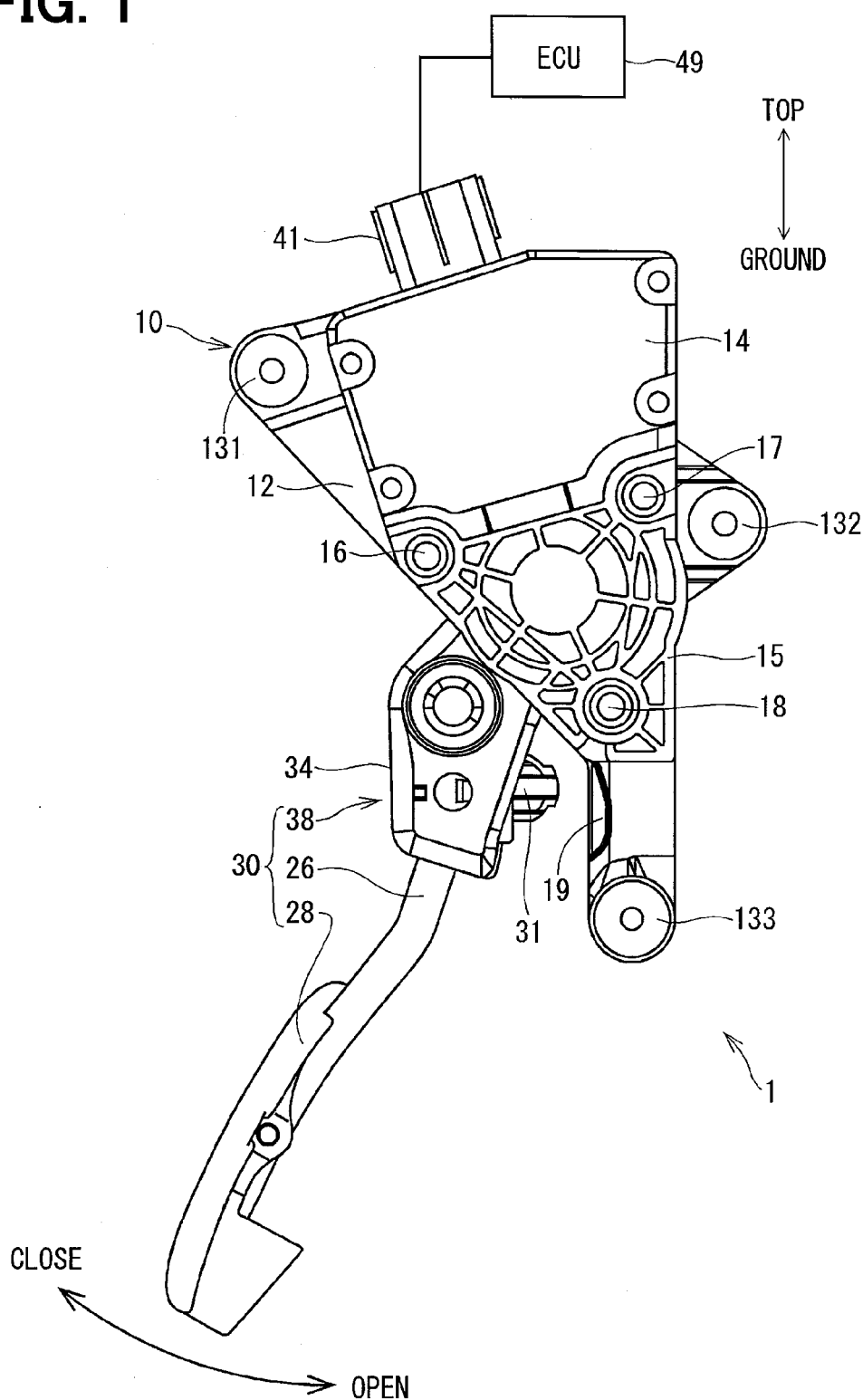
FIG. 1 is a side plan view of an accelerator apparatus according to a first embodiment.

An accelerator apparatus will be described with reference to plural embodiments shown in the drawings.

First Embodiment

Figure 2:
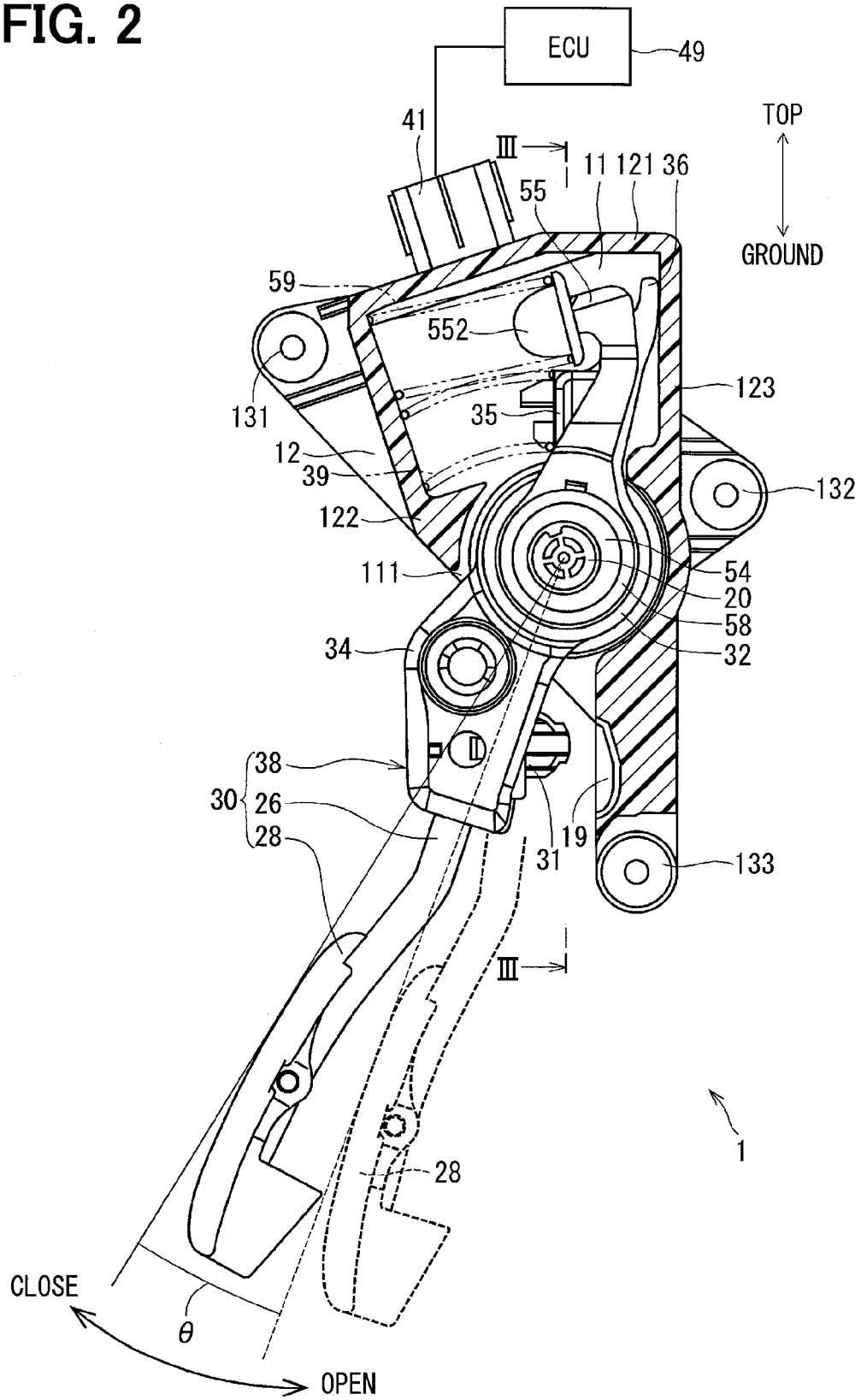
FIG. 2 is a side sectional view of the accelerator apparatus shown in FIG. 1.
Figure 3:
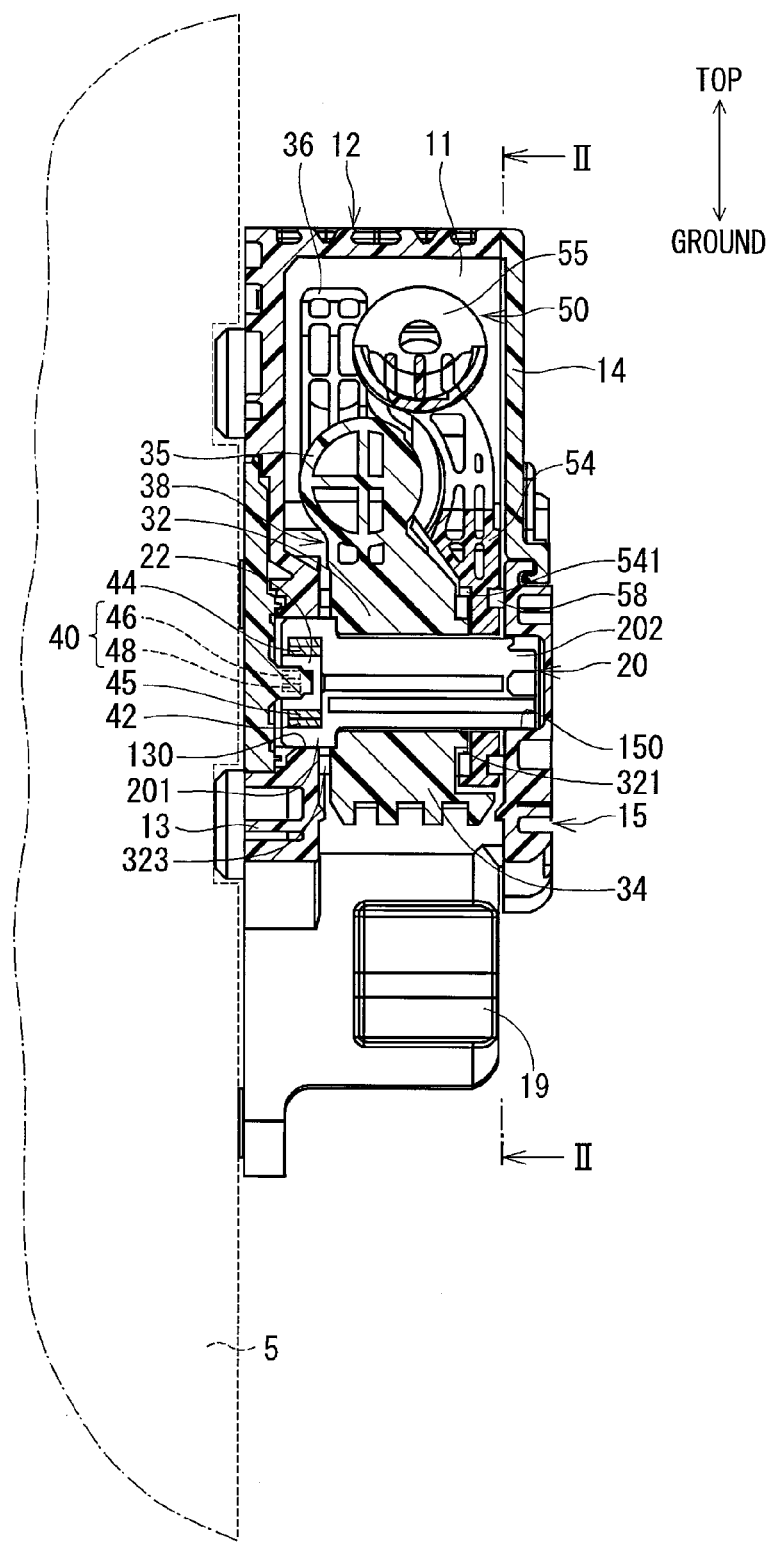
FIG. 3 is a sectional view taken along a line in FIG. 2.

Referring to FIG. 1 to FIG. 3, an accelerator apparatus according to a first embodiment is provided as an input apparatus, which a driver of a vehicle operates to determine a valve opening angle of a throttle valve of an engine for a vehicle. The accelerator apparatus 1 is an electronically-controlled type, which transmits an electric signal indicating an amount of depression (rotation angle) of an accelerator pedal 28 to an electronic control unit (ECU) of a vehicle, which is not shown. The electronic control unit of the vehicle drives a throttle valve by a throttle actuator, which is not shown, in accordance with information about the depression amount and other parameters.

The accelerator apparatus 1 is provided with a support device 10, a shaft 20, an operation device 30, a return spring 39, a rotation angle sensor 40, an ECU 49, a hysteresis mechanism 50 and the like. In the following description, upper parts and lower parts in FIG. 1 to FIG. 3 are referred to as top sides and ground sides, respectively.

The support device 10 is formed of a housing 12, a first cover 14 and a second cover 15. The support device 10 forms an inside space 11, which accommodates therein the shaft 20, the return spring 39, the rotation angle sensor 40, the hysteresis mechanism 50 and the like. In the lower part of the support device 10, a through hole 111 is formed. The through hole 111 communicates the inside space 11 and an outside space to allow rotational movement of the operation device 30 therein.

The housing 12 is a resin-made device, which is formed of a bearing 13, a front wall 122, a rear wall 123 and an upper wall 121. The bearing 13 bears one end 201 of the shaft 20 rotatably. The front wall 122 is joined to the bearing 13 and located in the front side of the accelerator apparatus 1. The rear wall 123 faces the front wall 122. The upper wall 121 connects the bearing part 13, the front wall 122 and the rear wall 123 at the top side of the accelerator apparatus 1. On outer surfaces of the bearing 13, the front wall 122, the rear wall 123 and the upper wall 121, concavities (recesses) and convexities (protrusions) are formed in a mesh form to provide resistance against external force, which acts on the housing 12.

An opening is formed in the bearing 13 to pass one end 201 of the shaft 20 therethrough. The shaft 20 is provided in the opening rotatably. That is, an inner wall of the opening operates as a bearing 130 for the end part 201 of the shaft 20.

As shown in FIG. 1, the housing 12 is formed with attachment parts 131, 132 and 133. The attachment parts 131, 132 and 133 are formed with bolt holes, respectively. The accelerator apparatus 1 is attached to a chassis 5 of a vehicle by bolts, which are inserted into the bolt holes.

A full-opening stopper 19 is formed as a maximum depression position in a concavity shape at the ground side of the rear wall 123. The full-opening stopper 19 restricts the rotation of the operation device 30 at an accelerator full-opening position when a convex-shaped full-opening stopper 31 provided on the operation device 30 contacts. The accelerator full-opening position is set to a position, at which a valve opening angle of the throttle valve becomes a maximum when the operation device 30 is depressed fully by the driver.

The first cover 14 and the second cover 15 are provided generally in parallel to the bearing 13 of the housing 12.

The first cover 14 is formed in a rectangular flat plate shape. The first cover 14 is latched to the second cover 15 in a manner to contact end parts of the cover 15. These end parts of the cover 15 are at a side opposite to a side, where the top wall 121, the rear wall 123 and the front wall 122 are joined to the bearing 13. The first cover 14 prevents foreign particles from entering into the inside space 11.

The second cover 15 is formed in a triangular flat plate shape. The second cover 15 is fixed by screws 16, 17 and 18 to end parts, which are at a side opposite to the side, where the rear wall 123 and the front wall 122 are joined to the bearing 13. A convex part, into which the other end 202 of the shaft 20 is inserted, is formed on an inner wall of the second cover 15 at the inside space 11 side. The shaft 20 is thus provided rotatably in this concave part. That is, an inside wall of this concave part operates as a bearing 150 for the other end part of the shaft 20. The second cover 15 prevents foreign particles from entering into the inside space 11.

The shaft 20 is provided in a horizontal direction at the ground side of the accelerator apparatus 1. A sensor receiving convex part 22, which receives therein a detection part of the rotation angle sensor 40, is formed on one end 201 of the shaft 20. A yoke 42, which is made of magnetic material and formed in a cylindrical shape, is fixed to an inner wall of the sensor receiving convex part 22. A pair of magnets 44 and 45 of different magnetic polarities is provided on the inner wall of the yoke 42 to face each other sandwiching a rotation axis of the shaft 20. The magnets 44 and 45 correspond to a magnetism generation device.

When the accelerator apparatus 1 is normal in operation, the shaft 20 rotates within a predetermined angular range in accordance with torque inputted from the operation device 30 in correspondence to a depression operation of a driver. The predetermined angular range is defined by a full-closure position to a full-opening position of the accelerator. The full-closure position of the accelerator operating normally is shown by a solid line in FIG. 2. This position is set to a position, at which the opening angle of the throttle valve, which is controlled by depressing the operation device 30, causes the engine of the vehicle 5 to remain in an idle state.

In the following description, the direction of rotation of the operation device 30 from its full-closure position toward its full-opening position is referred to as an opening direction of an accelerator. The direction of rotation of the operation device 30 from its full-opening position toward its full-closure position is referred to as a closing direction of an accelerator.

The operation device 30 is formed of a rotary body 38, a pedal 28 and a pedal arm 26. The rotary body 38 is formed of a boss 32, an arm link 34, a spring receiver 35, and a full-closure stopper 36, all of which are integrated.

The boss 32 is formed in an annular shape, provided between the bearing 13 and the second cover 15, and fixed to an outer wall of the shaft 20 by press-fitting. Thus the operation device 30 rotates with the shaft 20 as a single body about an axis of the shaft 20.

A first helical gear 321 is formed integrally on the side surface of the boss 32 at the second cover 15 side. The first helical gear 321 is formed plurally in number at equal intervals in a circumferential direction. The first helical gear 321 protrudes more toward the rotor 54 side of the hysteresis mechanism 50 as its position changes toward the closing direction in the circumferential direction. The first helical gear 321 has an inclined surface, which approaches closer to the rotor 54 as its position changes toward the closing direction.

A first friction member 323 is provided on the side surface of the boss 32 at the bearing 13 side. The first friction member 323 is formed in an annular shape and provided between the boss 32 and the inner wall of the housing 12 in a radially outside direction. When the boss 32 is pressed to leave away from the rotor 54, that is, toward the bearing 13, the boss 32 engages the first friction member 323 by friction. The force of friction between the boss 32 and the first friction member 323 becomes a resistance against rotation of the boss 32.

The arm link 34 is so formed that its one end connects to a radially outside surface of the boss 32 and its other end extends outwardly from the support device 10 by passing the through hole 111.

The spring receiver 35 is so formed to extend from the boss 32 in a direction toward the top in the inside space 11. The spring receiver 35 latches one end of the return spring 39.

The full-closure stopper 36 is so formed to extend from the spring receiver 35 further in the direction toward the top side in the inside space 11. The full-closure stopper 36 restricts the operation device 30 from rotating in the closing direction of the accelerator at the full-closure position (normal rest position) of the accelerator, when it contacts the inner wall of the rear wall 123.

As shown in FIG. 1 and FIG. 2, the pedal arm 26 is configured such that its one end is fixed to a connecting part 34 and its other end extends in the ground direction. The pedal 28 is connected to the other end of the pedal arm 26. The pedal 28 converts a depressing force of a driver to a rotary torque, which centers on the rotation axis of the shaft 20, and transfers the torque to the shaft 20 through a rotation body 38.

When the pedal 28 rotates in the accelerator opening direction from the fully-closed state of the accelerator apparatus 1 shown by the solid line in FIG. 2, the rotation angle of the pedal 28 in the accelerator opening direction increases relative to a base point, which corresponds to the full-closure position of the accelerator. When the pedal arm 26 and the pedal 28 move to a position indicated by a dotted line as shown in FIG. 2, the rotation angle of the pedal 28 is defined to be θ. The opening angle of the throttle valve increases in proportion to this rotation angle θ. When the pedal 28 rotates in the accelerator closing direction, the rotation angle θ of the pedal 28 decreases and the opening angle of the throttle valve decreases. The rotation angle θ of the pedal 28 corresponds to a rotation angle of the shaft 20 and the magnetism generation device.

The return spring 39 is formed of a coil spring and its other end is hooked to an inner wall of the front plate 122. This return spring 39, which is a biasing device, normally biases the operation device 30 to the accelerator closing direction. The biasing force, which the return spring 39 exerts on the operation device 30, increases as the rotation angle of the operation device 30, that is, the rotation angle θ of the pedal 28, increases. This biasing force is set to be able to return the operation device 30 and the shaft 20 to the accelerator full-closure position irrespective of the rotation position of the operation device 30.

The rotation angle sensor 40 is formed of a first Hall IC 46, a second Hall IC 48 and the like. Each Hall IC is an integrated circuit including a Hall element, which is responsive to magnetism applied thereto.

Figure 4:
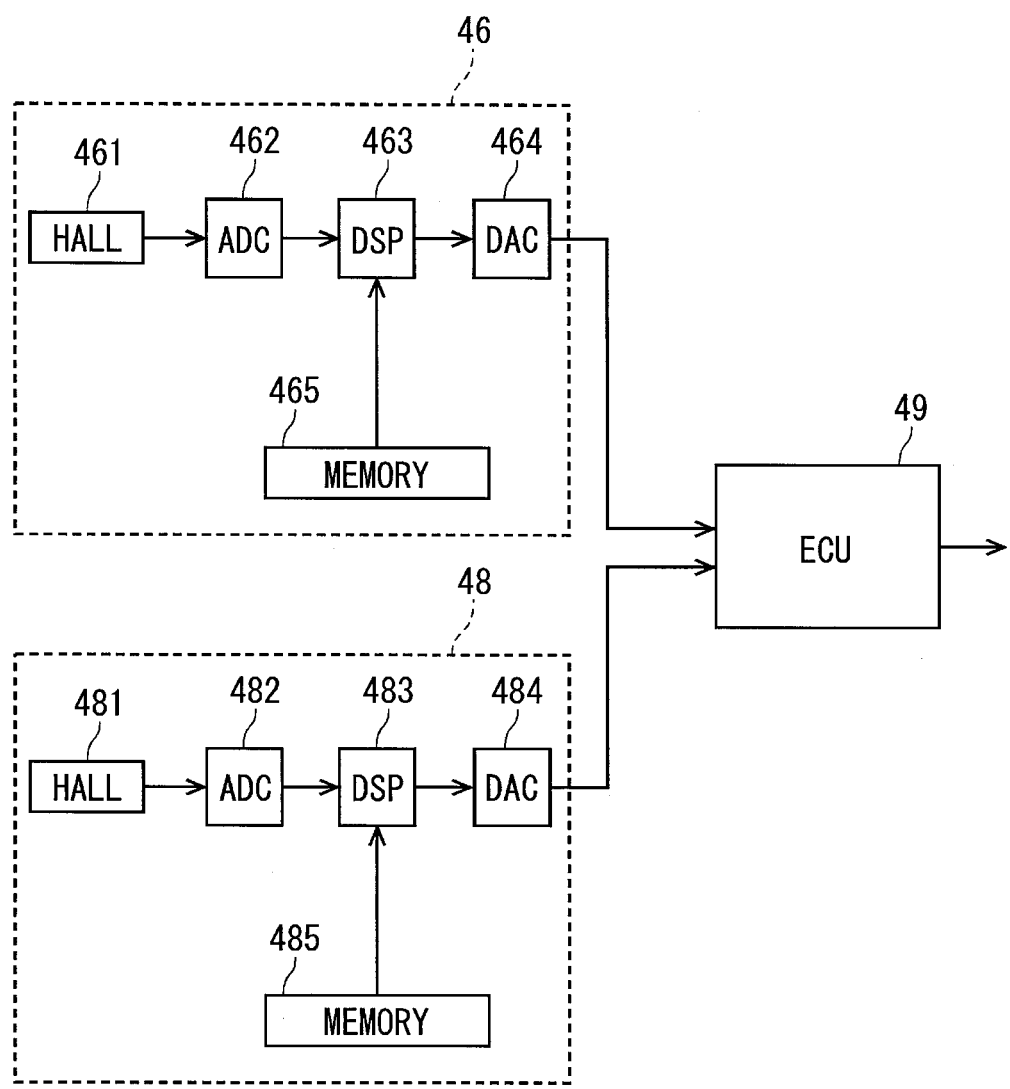
FIG. 4 is a circuit diagram showing Hall ICs and an ECU in the accelerator apparatus according to the first embodiment.

The first Hall IC 46 and the second Hall IC 48 have the similar circuit configuration and are located between the magnet 44 and the magnet 45 in the radial direction of the shaft 20. As shown in FIG. 4, the first Hall IC 46 is formed of a Hall element 461, an analog-to-digital conversion circuit (ADC) 462, a digital signal processor (DSP 463), a digital-to-analog conversion circuit (DAC) 464 and a memory 465. The second Hall IC 48 is formed of a Hall element 481, an ADC 482, a DSP 483, a DAC 484 and a memory 485. The first Hall IC 46 and the second Hall IC 48 calculate a first voltage V1 and a second voltage V2 including information about the rotation angle of the pedal 28 and outputs them as output voltages to the ECU 49 through a connector, respectively. The ECU 49 calculates the rotation angle θ of the pedal 28 based on the first voltage V1 and the second voltage V2 and checks whether the rotation angle θ of the pedal 28 is abnormal. The ECU 49 thus operates as an abnormality check device. The first Hall IC 46 and the second Hall IC 48 correspond to the magnetism detection devices. The first Hall IC 46 and the second Hall IC 48 correspond to one magnetism detection device (first magnetism detection device) and the other magnetism detection device (second magnetism detection device) among plural magnetism detection devices, respectively.

The hysteresis mechanism 50 is formed of a rotor 54, a second friction member 58, a hysteresis spring 59 and the like.

The rotor 54 is located between the boss 32 and an inner wall of a second cover 15 at a radially outside position of the shaft 20. The rotor 54 is formed in an annular shape to be relatively rotatable relative to the shaft 20 and the boss 32 and capable of approaching and separating relative to the boss 32. A second helical gear 541 is formed integrally on a side surface of the rotor 54 at the boss 32 side. The second helical gear 541 is formed plurally in number at equal intervals in a circumferential direction. The second helical gear 541 protrudes more toward the boss 32 side as its position changes toward the accelerator opening direction in the circumferential direction. The second helical gear 541 has an inclined surface, which approaches closer to the rotor 54 as its position changes toward the accelerator opening direction, at the tip end part.

The first spiral gear 321 and the second spiral gear 541 are capable of transferring rotation between the boss 32 and the rotor 54 with respective inclined surfaces contacting each other in the circumferential direction. That is, the rotation of the boss 32 in the accelerator opening direction is transferable to the rotor 54 through the first spiral gear 321 and the second spiral gear 541. Further, the rotation of the rotor 54 in the accelerator closing direction is transferable to the boss 32 through the second spiral gear 541 and the first spiral gear 321.

When the rotation angle of the boss 32 is at a rotation angle, which is more accelerator opening direction side than the rotation angle of the accelerator full-closure state, the first spiral gear 321 and the second spiral gear 541 separate the boss 32 and the rotor 54 from each other with respective inclined surfaces contacting each other. At this time, the first spiral gear 321 presses the boss 32 toward the housing 12 side by a force, which becomes larger as the rotation angle of the boss 32 from the accelerator full-closure position increases. Further, the second spiral gear 541 presses the rotor 54 toward the second cover 15 side by a force, which becomes larger as the rotation angle of the boss 32 from the accelerator full-closure position increases.

The second friction member 58 is formed in an annular shape and located between the rotor 54 and an inner wall of the second cover 15 at a radially outside position of the shaft 20. When the rotor 54 separates from the boss 32, that is, is pressed in the direction to the second cover 15, the rotor 54 engages the second friction member 58 by friction. The friction force between the rotor 54 and the second friction member 58 is a rotation resistance to the rotor 54.

A hysteresis spring 59 is formed of a coil spring. One end of the hysteresis spring 59 is hooked to a spring receiving member 552. The spring receiving member 552 is hooked to a spring hook part 55, which is formed to extend in the top direction in the inner space from the rotor 54. The other end is hooked to the inner wall of the front wall 122. The hysteresis spring 59 biases the rotor 54 in the accelerator closing direction. The biasing force of the hysteresis spring 59 increases as the rotation angle of the rotor 54 increases. The torque, which the rotor 54 receives by the biasing force of the hysteresis spring 59, is transferred to the boss 32 through the second spiral gear 541 and the first spiral gear 321.

Figure 5A:
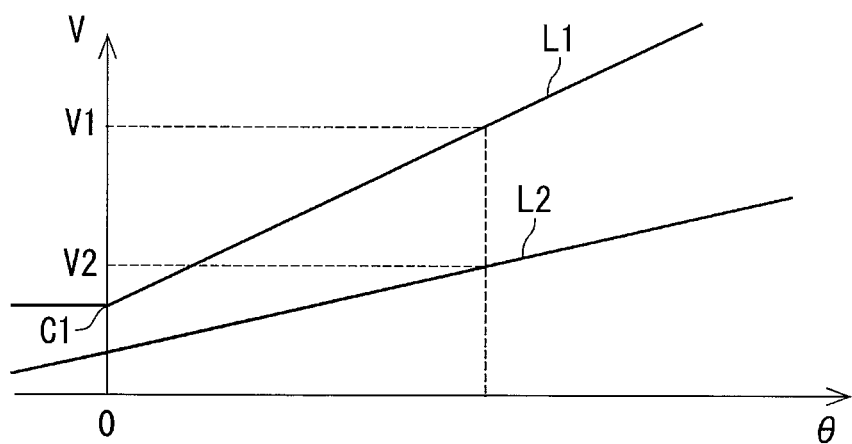
FIG. 5A and FIG. 5B are characteristic graphs showing relations among a rotation angle of a pedal, output voltages and an output difference in the accelerator apparatus according to the first embodiment.

The accelerator apparatus 1 according to the first embodiment performs its calculation processing of the first voltage V1 and the second voltage V2 of the first Hall IC 46 and the second Hall IC 48 as well as abnormality check processing by the ECU 49. These processing are described with reference to FIG. 4, FIG. 5A and FIG. 5B. FIG. 5A shows a relation between the first voltage V1, the second voltage V2 and the rotation angle θ of the pedal 28. In FIG. 5A, the relation between the first voltage V1 and the rotation angle θ of the pedal 28 is indicated by a solid line L1 and the relation between the second voltage V2 and the rotation angle θ of the pedal 28 is indicated by a solid line L2.

Figure 5B:
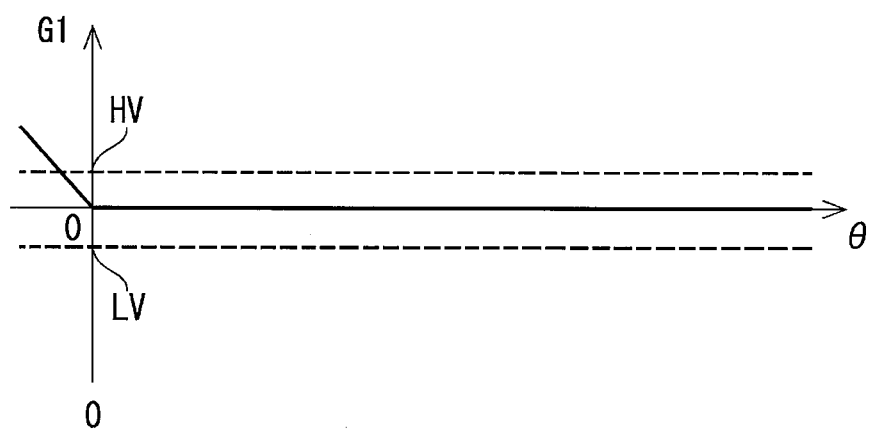

FIG. 5B shows a relation between an output difference G1, which is a voltage difference calculated from the first voltage V1 and the second voltage V2, and the rotation angle θ of the pedal 28. In FIG. 5A and FIG. 5B, the rotation angle θ of the pedal is assumed to be 0° as a low limit value of the normal rotation angle of the magnetism generation device under a state that the accelerator apparatus 1 assumes a state shown in FIG. 2, that is, the full-closure stopper 36 is in contact with the rear wall 123 of the support device 10.

The Hall elements 461 and 481 generate voltages when magnetic field is applied to the Hall elements 461 and 481, in which currents flow, respectively, based on Hall effect. Densities of magnetic flux passing through the Hall elements 461 and 481 change when the magnets 44 and 45 rotate about the rotation axis of the shaft 20 with the shaft 20. Magnitudes of the generated voltages are proportional to the densities of magnetic flux passing through the Hall elements 461 and 481.

The voltages generated by the Hall elements 461, 481 are converted to digital signals by the ADCs 462, 482 and inputted to DSPs 463, 483, respectively. The DSPs 463 and 483 calculate the first voltage V1 and the second voltage V2 based on the inputted digital signals. The digital signals of the first voltage V1 and the second voltage V2 calculated by the DSPs 463 and 483 are converted to analog signals by the DACs 464 and 484, respectively, and inputted to the ECU 49. The ECU 49 calculates the rotation angle θ of the pedal 28 based on the first voltage V1 and the second voltage V2 and checks whether the rotation angle θ is abnormal.

In the accelerator apparatus 1 according to the first embodiment, the DSPs 463 and 483 perform the calculation processing so that the magnitude of the first voltage V1 becomes twice as large as the magnitude of the second voltage V2 at an arbitrary rotation angle θ, which is 0° or more. That is, the first voltage V1 and the second voltage V2 satisfy a relational expression, which is defined by the following equation (1).

$$V1 = V2 \times 2 \quad (1)$$

The first voltage V1 corresponds to one output voltage (first output voltage) VA. The second voltage V2 corresponds to the other output voltage (second output voltage) VB.

The ECU 49 calculates the output difference G1 based on the first voltage V1 and the second voltage V2. The output difference G1 is defined by the following equation (2).

$$G1 = V1/2 - V2 \quad (2)$$

In the accelerator apparatus 1, as shown in FIG. 5B, a first threshold value HV and a second threshold value LV are set as high and low threshold values at a larger side and a smaller side than the output difference G1, respectively. The rotation angle θ is determined to be normal when the output difference G1 calculated by the equation (2) is between the first threshold value HV and the second threshold value LV.

In the accelerator apparatus 1, the first voltage V1 is set to be twice as large as the second voltage V2 in magnitude at the arbitrary rotation angle θ, which is 0° or greater than 0°. For this reason, when the rotation angle θ is 0° or more, the output difference G1 becomes 0 and remains between the first threshold value HV and the second threshold value LV, that is, in a predetermined range. The ECU 49 thus determines that the rotation angle of the pedal 28 is normal, that is, the accelerator apparatus 1 is normal.

When the rotation angle θ of the pedal 28 is less than 0°, the DSP 463 of the first Hall IC 46 sets the first voltage V1 to a fixed value C1 as shown in, for example, FIG. 5A. That is, when the rotation angle θ is less than 0°, the first voltage V1 is different from a value calculated based on the relational expression defined by the equation (1) and clamped. When the rotation angle of the pedal 28 is less than 0°, the output difference G1 calculated by the ECU 49 based on the equation (2) becomes greater than 0. When the rotation angle θ becomes less than 0° as shown in FIG. 5B and the output difference G1 becomes equal to or greater than the first threshold value HV, the output difference G1 exceeds the predetermined range and the ECU 49 determines that the rotation angle θ is abnormal.

An operation of the accelerator apparatus 1 according to the first embodiment will be described below.

When the pedal 28 is depressed, the operation device 30 rotates in the accelerator opening direction about the rotation axis of the shaft 20 together with the shaft 20 in accordance with the depressing force applied to the pedal 28. The operation device 30 and the shaft 20 require for rotation a depressing force, which produces a torque larger than a sum of a biasing torque and a resistance torque. The biasing torque is produced by the biasing forces of the return spring 39 and the hysteresis spring 59. The resistance torque is produced by the friction forces of the first friction member 323 and the second friction member 58.

The resistance torque produced by the friction force of the first friction member 323 and the second friction member 58 functions to suppress rotation of the pedal 28 in the accelerator opening direction when the pedal 28 is depressed. As a result, for the same rotation angle, the depressing force is larger when the pedal 28 is depressed than when the pedal 28 is returned.

To maintain the depression of the pedal 28 after depressing the pedal 28, it is only required to apply a depressing force larger than the difference between the biasing torque and the resistance torque. The biasing torque is produced by the biasing forces of the return spring 39 and the hysteresis spring 59. The resistance torque is produced by the friction forces of the first friction member 323 and the second friction member 58. That is, a driver is allowed to reduce the depressing force to maintain the depression of the pedal 28 after depressing the pedal 28. The resistance torque produced by the friction forces of the first friction member 323 and the second friction member 58 operates to reduce rotation of the pedal 28 in the accelerator closing direction when the depression of the pedal 28 is maintained.

To return depression of the pedal 28 to the accelerator full-closure position side, a depressing force of a small toque is applied. This small torque is smaller than the difference between the biasing torque corresponding to the biasing forces of the return spring 39 and the hysteresis spring 59 and the resistance torque produced by the friction forces of the first friction member 323 and the second friction member 58. It is only required to stop depressing the pedal 28 when the pedal 28 need be returned to the full-closure position. This does not require the driver to take a special operation. That is, the driver can easily return the depression of the pedal 28. The resistance torque produced by the friction forces of the first friction member 323 and the second friction member 58 operate to suppress rotation of the pedal 28 in the acceleration closing direction when the depression of the pedal 28 is reduced.

In the accelerator apparatus 1 according to the first embodiment, the ECU 49 checks whether the rotation angle θ of the pedal 28 is abnormal based on the output difference G1 calculated from the first voltage V1 and the second voltage V2. When the rotation angle θ of the pedal 28 becomes smaller than 0°, the first Hall IC 46 sets the first voltage V1 to the value C1, which is predetermined to be positive, and outputs it to the ECU 49. In the ECU 49, the output difference G1 is calculated based on the first voltage V1 of the fixed value and the second voltage V2, which varies with the rotation angle θ in a positive value range even when the rotation angle θ is less than 0°. When the calculated output difference G1 becomes equal to or greater than the first threshold value HV, the ECU 49 determines that the accelerator apparatus 1 is abnormal. Thus the accelerator apparatus 1 is capable of detecting that the rotation angle θ is abnormal because of excessive rotation of the pedal 28 in the accelerator closing direction from the rotation angle of the accelerator full-closure state. As a result, for example, it is possible to detect the abnormality indicating that the pedal 28 does not return to the full-closure position because of a breakage in the full-closure stop part 36.

The check processing about the rotation angle θ can be executed by simply changing an arithmetic operation processing of the DSP 463, which calculates the first voltage V1. It is thus possible to detect abnormality in the rotation angle θ in low costs.

Second Embodiment

An accelerator apparatus according to a second embodiment will be described next with reference to FIG. 6A and FIG. 6B. The second embodiment is different from the first embodiment in a relation between a first voltage and a second voltage. Substantially the same parts as the first embodiment are designated by the same reference numerals to simplify the description.

Figure 6A:
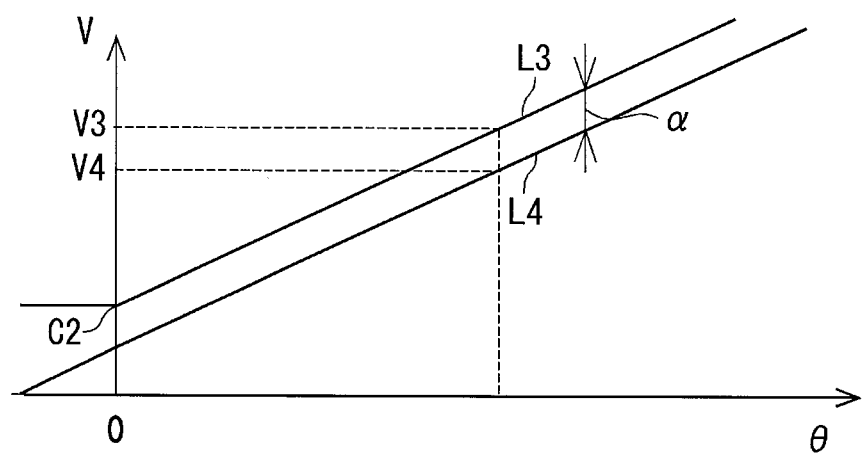
FIG. 6A and FIG. 6B are characteristic graphs showing relations among a rotation angle of a pedal, output voltages and an output difference in an accelerator apparatus according to a second embodiment.
Figure 6B:
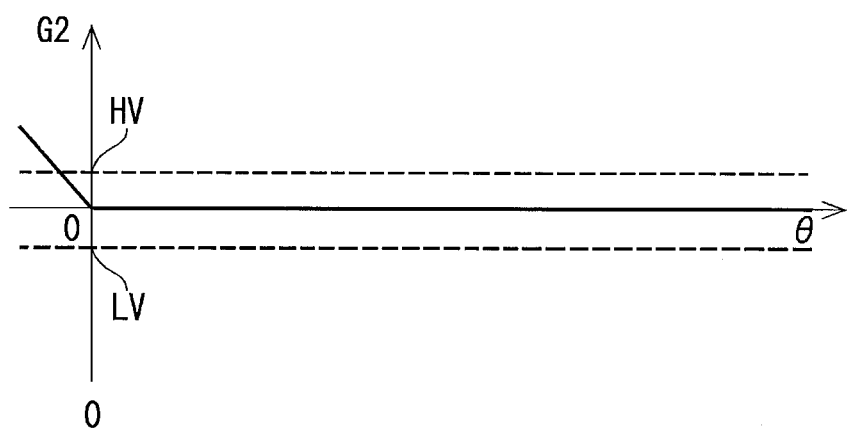

FIG. 6A shows a relation between a first voltage V3, a second voltage V4 and a rotation angle θ of the pedal 28. In FIG. 6A, a relation between the first voltage V3 and the rotation angle θ of the pedal 28 is indicated by a solid line L3 and a relation between the second voltage V4 and the rotation angle θ of the pedal 28 is indicated by a solid line L4. FIG. 6B shows a relation between an output difference G2, which is a voltage difference calculated from the first voltage V3 and the second voltage V4, and the rotation angle θ of the pedal 28.

In the accelerator apparatus according to the second embodiment, the DSPs 463 and 483 calculate respective output voltages so that the magnitude of the first voltage V3 is larger than the magnitude of the second voltage V4 by a fixed value of an arbitrary value a, for example, at an arbitrary angle of the rotation angle θ at 0° or more as shown in FIG. 6A. That is, the first voltage V3 and the second voltage V4 satisfy a relational expression, which is defined by the following equation (3).

$$V3=V4+a \quad (3)$$

The first voltage V3 corresponds to one output voltage (first output voltage) VA. The second voltage V4 corresponds to the other output voltage (second output voltage) VB.

In this case, the output difference G2 is defined by the following equation (4).

$$G2=V3-V4-a \quad (4)$$

At the arbitrary rotation angle θ, which is 0° or more, the output difference G2 is 0 and remains between the first threshold value HV and the second threshold value LV, that is, within the predetermined range. The ECU 49 determines that the rotation angle θ of the pedal 28 is normal.

When the rotation angle θ of the pedal 28 is less than 0°, the DSP 463 of the first Hall IC 46 sets the first voltage V3 to a fixed value C2 as shown in, for example, FIG. 6A. That is, when the rotation angle θ is less than 0°, the first voltage V3 is different from the value calculated based on the relational expression defined by the equation (3) and clamped. When the rotation angle θ of the pedal 28 is less than 0°, the output difference G2 calculated by the ECU 49 based on the equation (4) becomes greater than 0. When the output difference G2 becomes equal to or greater than the first threshold value HV, the output difference G2 exceeds the predetermined range and the ECU 49 determines that the rotation angle θ is abnormal.

The accelerator apparatus according to the second embodiment determines that the rotation angle θ of the pedal 28 is abnormal when the output difference G2 calculated by the ECU 49 is equal to or greater than the first threshold value HV. Thus the accelerator apparatus according to the second embodiment provides the same advantage as the first embodiment.

Third Embodiment

An accelerator apparatus according to a third embodiment will be described next with reference to FIG. 7A and FIG. 7B. The third embodiment is different from the first embodiment in that a first voltage, which a first Hall IC output, is fixed at a rotation angle different from 0°. Substantially the same parts as the first embodiment are designated by the same reference numerals to simplify the description.

Figure 7A:
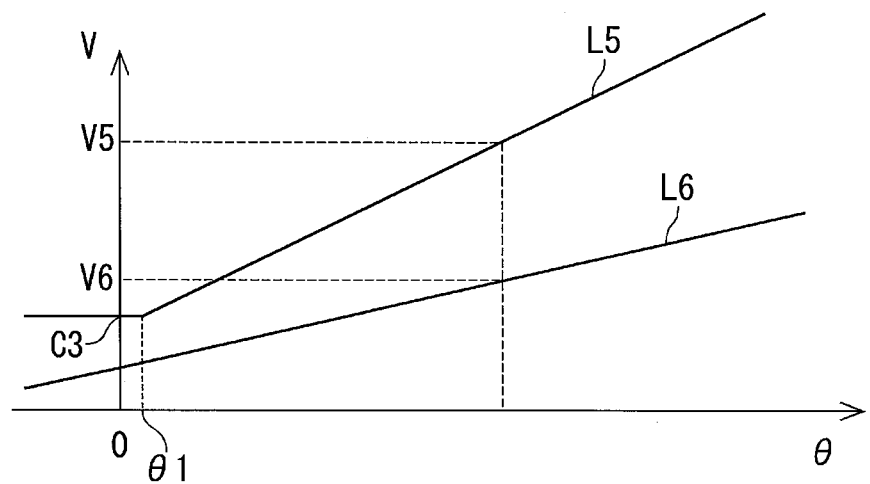
FIG. 7A and FIG. 7B are characteristic graphs showing relations among a rotation angle of a pedal, output voltages and an output difference in an accelerator apparatus according to a third embodiment.
Figure 7B:
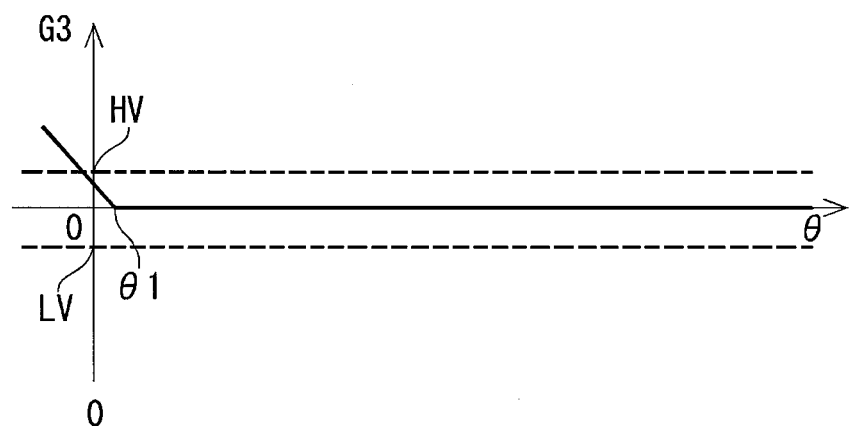

FIG. 7A shows a relation between a first voltage V5, a second voltage V6 and the rotation angle θ of the pedal 28. In FIG. 7A, a relation between the first voltage V5 and the rotation angle θ of the pedal 28 is indicated by a solid line L5 and a relation between the second voltage V6 and the rotation angle θ of the pedal 28 is indicated by a solid line L6. FIG. 7B shows a relation between an output difference G3, which is a voltage difference calculated from the first voltage V5 and the second voltage V6, and the rotation angle θ of the pedal 28.

In the accelerator apparatus according to the third embodiment, the DSPs 463 and 483 calculate respective output voltages so that the magnitude of the first voltage V5 is twice as large as the magnitude of the second voltage V6 at an arbitrary angle of the rotation angle θ, which is equal to or greater than a predetermined angle θ1 in the accelerator opening direction from the rotation angle θ°. That is, the first voltage V5 and the second voltage V6 satisfy a relational expression, which is defined by the following equation (5).

$$V5 = V6 \times 2 \qquad (5)$$

The first voltage V5 corresponds to one output voltage (first output voltage) VA. The second voltage V6 corresponds to the other output voltage (second output voltage) VB.

In this case, the output difference G3 is defined by the following equation (6).

$$G3 = V5/2 - V6 \qquad (6)$$

At the arbitrary rotation angle θ, which is equal to a predetermined rotation angle θ1 or more, the output difference G3 is 0 and remains between the first threshold value HV and the second threshold value LV, that is, within the predetermined range. The ECU 49 determines that the rotation angle θ of the pedal 28 is normal.

When the rotation angle θ of the pedal 28 is less than the predetermined rotation angle θ1, the DSP 463 of the first Hall IC 46 sets the first voltage V5 to a fixed value C3 as shown in, for example, FIG. 7A. That is, when the rotation angle θ is less than the predetermined rotation angle θ1, the first voltage V5 is different from a value calculated based on the relational expression defined by the equation (5) and clamped. When the rotation angle θ of the pedal 28 is less than the predetermined rotation angle θ1, the output difference G3 calculated by the ECU 49 based on the equation (6) becomes greater than 0. In this case, when the rotation angle θ is in the range of 0° and θ1, the output difference G3 remains between the first threshold value HV and the second threshold value LV. When the output difference G3 becomes equal to or greater than the first threshold value HV, the output difference G3 exceeds the predetermined range and the ECU 49 determines that the rotation angle θ is abnormal.

The accelerator apparatus according to the third embodiment determines that the rotation angle θ of the pedal 28 is abnormal when the output difference G3 calculated by the ECU 49 is equal to or greater than the first threshold value HV. Thus the accelerator apparatus according to the third embodiment provides the same advantage as the first embodiment.

Fourth Embodiment

An accelerator apparatus according to a fourth embodiment will be described next with reference to FIG. 8A and FIG. 8B. The fourth embodiment is different from the third embodiment in a relation between a first voltage and a second voltage. Substantially the same parts as the third embodiment are designated by the same reference numerals to simplify the description.

Figure 8A:
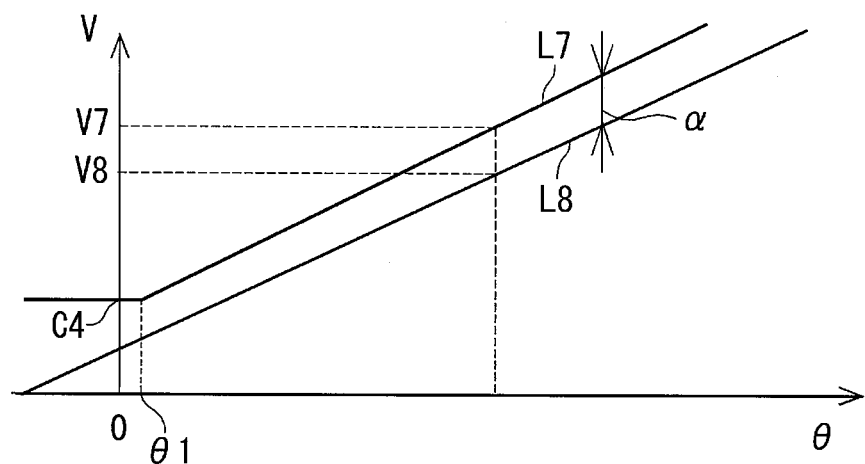
FIGS. 8A and 8B are characteristic graphs showing relations among a rotation angle of a pedal, output voltages and an output difference in an accelerator apparatus according to a fourth embodiment.
Figure 8B:
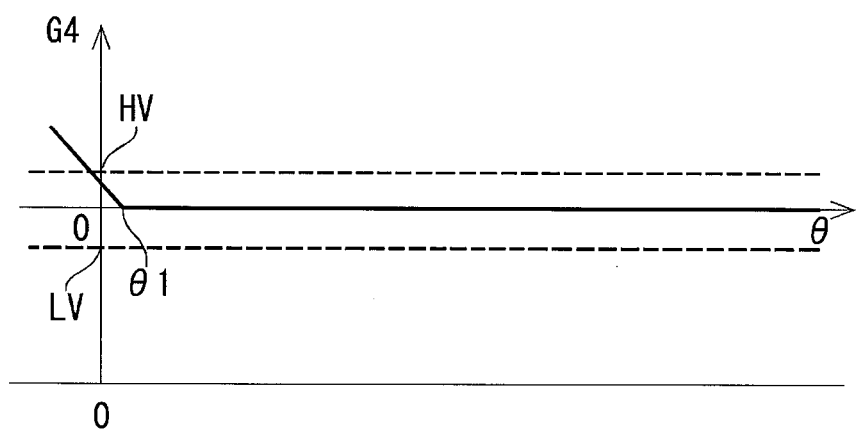

FIG. 8A shows a relation between a first voltage V7, a second voltage V8 and the rotation angle θ of the pedal 28. In FIG. 8A, a relation between the first voltage V7 and the rotation angle θ of the pedal 28 is indicated by a solid line L7 and a relation between the second voltage V8 and the rotation angle θ of the pedal 28 is indicated by a solid line L8. FIG. 8B shows a relation between an output difference G4, which is a voltage difference calculated from the first voltage V7 and the second voltage V8, and the rotation angle θ of the pedal 28.

In the accelerator apparatus according to the fourth embodiment, the DSPs 463 and 483 calculate respective output voltages so that the magnitude of the first voltage V7 is larger than the magnitude of the second voltage V8 by a fixed value of an arbitrary value a, for example, at an arbitrary angle of the rotation angle θ at a predetermined rotation angle θ1 or more as shown in FIG. 8A. That is, the first voltage V7 and the second voltage V8 satisfy a relational expression, which is defined by the following equation (7).

$$V7 = V8 + a \qquad (7)$$

The first voltage V7 corresponds to one output voltage (first output voltage) VA. The second voltage V8 corresponds to the other output voltage (second output voltage) VB.

In this case, the output difference G4 is defined by the following equation (8).

$$G4 = V7 - V8 - a \qquad (8)$$

At the arbitrary rotation angle θ, which is the predetermined rotation angle θ1 or more, the output difference G4 is 0 and remains between the first threshold value HV and the second threshold value LV, that is, within the predetermined range. The ECU 49 determines that the rotation angle θ of the pedal 28 is normal.

When the rotation angle θ of the pedal 28 is less than the predetermined rotation angle θ1, the DSP 463 of the first Hall IC 46 sets the first voltage V7 to a fixed value C4 as shown in, for example, FIG. 8A. That is, when the rotation angle θ is less than the predetermined rotation angle θ1, the first voltage V7 is different from a value calculated based on the relational expression defined by the equation (7) and clamped. When the rotation angle θ of the pedal 28 is less than the predetermined rotation angle θ1, the output difference G4 calculated by the ECU 49 based on the equation (8) becomes greater than 0. When the rotation angle θ is between 0° and the predetermined rotation angle θ1, the output difference G4 remains between the first threshold value HV and the second threshold value LV. When the rotation angle θ becomes equal to or greater than the first threshold value HV, the output difference G4 exceeds the predetermined range and the ECU 49 determines that the rotation angle θ is abnormal.

The accelerator apparatus according to the fourth embodiment determines that the rotation angle θ of the pedal 28 is abnormal when the output difference G2 calculated by the ECU 49 is equal to or greater than the first threshold value HV. Thus the accelerator apparatus according to the fourth embodiment provides the same advantage as the third embodiment.

Fifth Embodiment

An accelerator apparatus according to a fifth embodiment will be described next with reference to FIG. 9A and FIG. 9B. The fifth embodiment is different from the first embodiment in that a value of a first voltage outputted by a first Hall IC is different from that of the first embodiment when a rotation angle θ of a pedal 28 is less than 0°. Substantially the same parts as the first embodiment are designated by the same reference numerals to simplify the description.

Figure 9A:
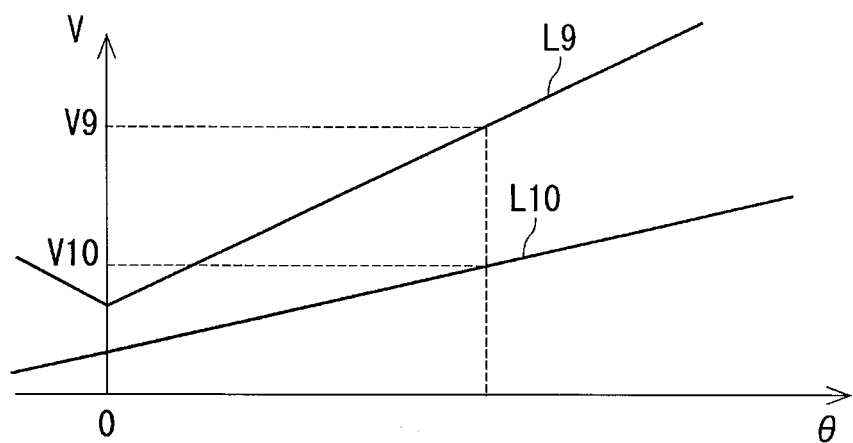
FIG. 9A and FIG. 9B are characteristic graphs showing relations among a rotation angle of a pedal, output voltages and an output difference in an accelerator apparatus according to a fifth embodiment.
Figure 9B:
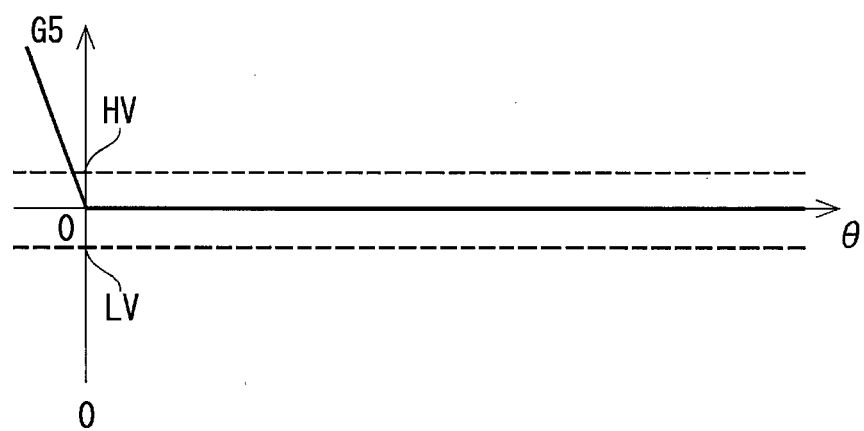

FIG. 9A shows a relation between a first voltage V9, a second voltage V10 and a rotation angle θ of a pedal 28. In FIG. 9A, a relation between the first voltage V9 and the rotation angle θ of the pedal 28 is indicated by a solid line L9 and a relation between the second voltage V10 and the rotation angle θ of the pedal 28 is indicated by a solid line L10. FIG. 9B shows a relation between an output difference G5, which is a voltage difference calculated from the first voltage V9 and the second voltage V10, and the rotation angle θ of the pedal 28.

In the accelerator apparatus according to the fifth embodiment, the DSPs 463 and 483 calculate respective output voltages so that the magnitude of the first voltage V9 is twice as large as the magnitude of the second voltage V10 at a rotation angle, which is greater than 0° in an accelerator opening direction. That is, the first voltage V9 and the second voltage V10 satisfy a relational expression, which is defined by the following equation (9).

$$V9 = V10 \times 2 \quad (9)$$

The first voltage V9 corresponds to one output voltage (first output voltage) VA. The second voltage V10 corresponds to the other output voltage (second output voltage) VB.

In this case, the output difference G5 is defined by the following equation (10).

$$G5 = V9/2 - V10 \quad (10)$$

At the arbitrary rotation angle θ, which is 0° or more, the output difference G5 is 0 and remains between the first threshold value HV and the second threshold value LV, that is, within the predetermined range. The ECU 49 determines that the rotation angle θ of the pedal 28 is normal.

When the rotation angle θ of the pedal 28 is less than 0°, the DSP 463 of the first Hall IC 46 sets the first voltage V9 to increase as the rotation angle θ of the pedal 28 decreases from 0° as shown in, for example, FIG. 9A. That is, when the rotation angle θ is less than 0°, the first voltage V9 is different from a value calculated based on the relational expression defined by the equation (9). When the rotation angle θ of the pedal 28 is less than 0°, the output difference G5 calculated by the ECU 49 based on the equation (10) becomes greater than 0. When the output difference G5 becomes equal to or greater than the first threshold value HV, the output difference G5 exceeds the predetermined range and the ECU 49 determines that the rotation angle θ is abnormal.

The accelerator apparatus according to the fifth embodiment determines that the rotation angle θ of the pedal 28 is abnormal when the output difference G5 calculated by the ECU 49 is equal to or greater than the first threshold value HV. Thus the accelerator apparatus according to the fifth embodiment provides the same advantage as the first embodiment.

In the accelerator apparatus according to the fifth embodiment, the output difference G5 increases as the rotation angle θ of the pedal 28 decreases from 0°. Thus, a rate of change of the output difference G5 relative to the rotation angle θ is greater than the output difference G1 of the first embodiment. The accelerator apparatus according to the fifth embodiment can readily detect an abnormality of the accelerator apparatus in a shorter time than in the first embodiment.

Sixth Embodiment

An accelerator apparatus according to a sixth embodiment will be described next with reference to FIG. 10A and FIG. 10B. The sixth embodiment is different from the second embodiment in that a value of a first voltage outputted by a first Hall IC is different from that of the second embodiment when a rotation angle θ of a pedal 28 is less than 0°. Substantially the same parts as the second embodiment are designated by the same reference numerals to simplify the description.

Figure 10A:
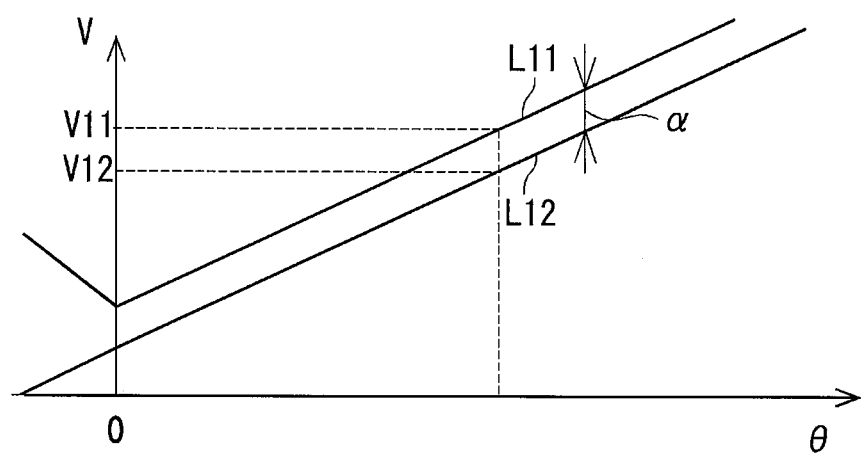
FIG. 10A and FIG. 10B are characteristic graphs showing relations among a rotation angle of a pedal, output voltages and an output difference in an accelerator apparatus according to a sixth embodiment.
Figure 10B:
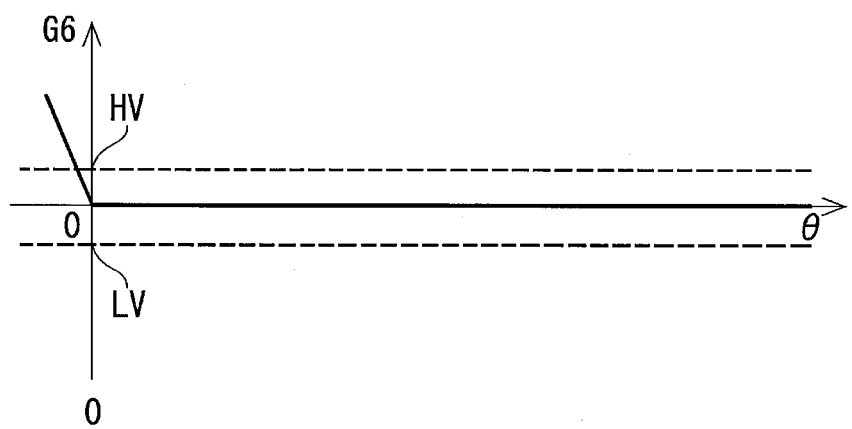

FIG. 10A shows a relation between a first voltage V11, a second voltage V12 and a rotation angle θ of a pedal 28. In FIG. 9A, a relation between the first voltage V9 and the rotation angle θ of the pedal 28 is indicated by a solid line L9 and a relation between the second voltage V10 and the rotation angle θ of the pedal 28 is indicated by a solid line L10. FIG. 10B shows a relation between an output difference G6, which is a voltage difference calculated from the first voltage V11 and the second voltage V12, and the rotation angle θ of the pedal 28.

In the accelerator apparatus according to the sixth embodiment, the DSPs 463 and 483 calculate the first voltage and the second voltage so that the magnitude of the first voltage V11 is larger than the magnitude of the second voltage V10 by a predetermined value, which is an arbitrary value a for example as shown in FIG. 10A, at a rotation angle, which is greater than 0° in an accelerator opening direction. That is, the first voltage V11 and the second voltage V12 satisfy a relational expression, which is defined by the following equation (11).

$$V11 = V12 + a \quad (11)$$

The first voltage V11 corresponds to one output voltage (first output voltage) VA. The second voltage V10 corresponds to the other output voltage (second output voltage) VB.

In this case, the output difference G6 is defined by the following equation (12).

$$G6 = V11 - V12 - a \quad (12)$$

At the arbitrary rotation angle θ, which is 0° or more, the output difference G6 is 0 and remains between the first threshold value HV and the second threshold value LV, that is, within the predetermined range. The ECU 49 determines that the rotation angle θ of the pedal 28 is normal.

When the rotation angle θ of the pedal 28 is less than 0°, the DSP 463 of the first Hall IC 46 sets the first voltage V11 to increase as the rotation angle θ of the pedal 28 decreases from 0° as shown in, for example, FIG. 10A. That is, when the rotation angle θ is less than 0°, the first voltage V11 is different from a value calculated based on the relational expression defined by the equation (11). When the rotation angle θ of the pedal 28 is less than 0°, the output difference G6 calculated by the ECU 49 based on the equation (12) becomes greater than 0. When the output difference G6 becomes equal to or greater than the first threshold value HV, the output difference G6 exceeds the predetermined range and the ECU 49 determines that the rotation angle θ is abnormal.

The accelerator apparatus according to the sixth embodiment determines that the rotation angle θ of the pedal 28 is abnormal when the output difference G6 calculated by the ECU 49 is equal to or greater than the first threshold value HV. Thus the accelerator apparatus according to the sixth embodiment provides the same advantage as the second embodiment.

In the accelerator apparatus according to the sixth embodiment, the output difference G6 increases as the rotation angle θ of the pedal 28 decreases from 0°. Thus, a rate of change of the output difference G6 relative to the rotation angle θ is greater than the output difference G2 of the second embodiment. The accelerator apparatus according to the sixth embodiment can readily detect an abnormality of the accelerator apparatus in a shorter time than in the second embodiment.

Seventh Embodiment

An accelerator apparatus according to a seventh embodiment will be described next with reference to FIG. 11A and FIG. 11B. The seventh embodiment is different from the third embodiment in that a value of a first voltage outputted by a first Hall IC is different from that of the third embodiment when a rotation angle θ of the pedal 28 is less than a predetermined rotation angle θ1. Substantially the same parts as the third embodiment are designated by the same reference numerals to simplify the description.

Figure 11A:
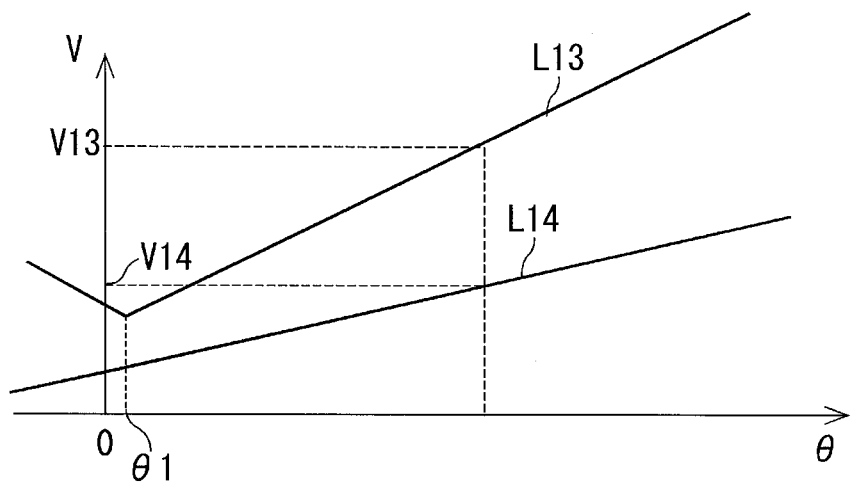
FIG. 11A and FIG. 11B are characteristic graphs showing relations among a rotation angle of a pedal, output voltages and an output difference in an accelerator apparatus according to a seventh embodiment.
Figure 11B:
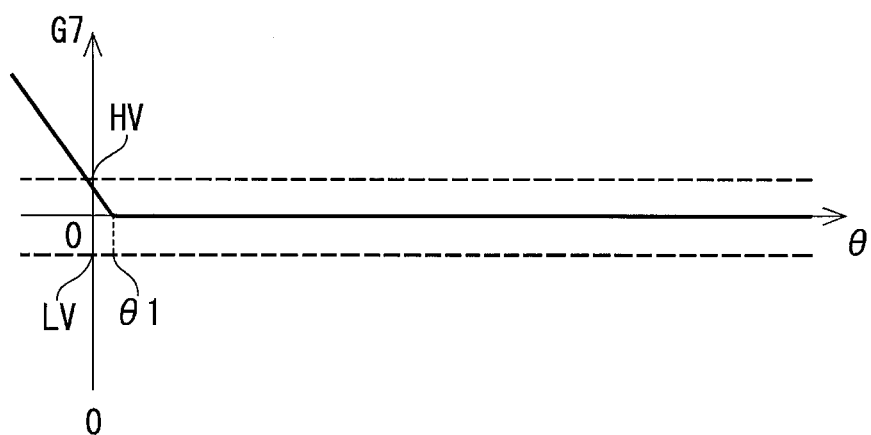

FIG. 11A shows a relation between a first voltage V13, a second voltage V14 and a rotation angle θ of a pedal 28. In FIG. 11A, a relation between the first voltage V13 and the rotation angle θ of the pedal 28 is indicated by a solid line L13 and a relation between the second voltage V14 and the rotation angle θ of the pedal 28 is indicated by a solid line L14. FIG. 11B shows a relation between an output difference G7, which is a voltage difference calculated from the first voltage V13 and the second voltage V14, and the rotation angle θ of the pedal 28.

In the accelerator apparatus according to the seventh embodiment, the DSPs 463 and 483 calculate respective output voltages so that the magnitude of the first voltage V13 is twice as large as the magnitude of the second voltage V14 at a rotation angle, which is equal to or greater than a predetermined rotation angle θ1. That is, the first voltage V13 and the second voltage V14 satisfy a relational expression, which is defined by the following equation (13).

$$V13 = V14 \times 2 \quad (13)$$

The first voltage V13 corresponds to one output voltage (first output voltage) VA. The second voltage V14 corresponds to the other output voltage (second output voltage) VB.

In this case, the output difference G7 is defined by the following equation (14).

$$G7 = V13/2 - V14 \quad (14)$$

At the arbitrary rotation angle θ, which is the predetermined angle θ1 or more, the output difference G7 is 0 and remains between the first threshold value HV and the second threshold value LV, that is, within the predetermined range. The ECU 49 determines that the rotation angle θ of the pedal 28 is normal.

When the rotation angle θ of the pedal 28 is less than the predetermined rotation angle θ1, the DSP 463 of the first Hall IC 46 sets the first voltage V13 to increase as the rotation angle θ of the pedal 28 decreases from the predetermined rotation angle θ1 as shown in, for example, FIG. 11A. That is, when the rotation angle θ is less than the predetermined rotation angle θ1, the first voltage V13 is different from a value calculated based on the relational expression defined by the equation (13). When the rotation angle θ of the pedal 28 is less than the predetermined rotation angle θ1, the output difference G7 calculated by the ECU 49 based on the equation (14) becomes greater than 0. In this case, when the rotation angle θ is between 0° and the predetermined rotation angle θ1, the output difference remains between the first threshold value HV and the second threshold value LV. When the output difference G7 becomes equal to or greater than the first threshold value HV, the output difference G7 exceeds the predetermined range and the ECU 49 determines that the rotation angle θ is abnormal.

The accelerator apparatus according to the seventh embodiment determines that the rotation angle θ of the pedal 28 is abnormal when the output difference G7 calculated by the ECU 49 is equal to or greater than the first threshold value HV. Thus the accelerator apparatus according to the seventh embodiment provides the same advantage as the first embodiment.

In the accelerator apparatus according to the seventh embodiment, the output difference G7 increases as the rotation angle θ of the pedal 28 decreases from the predetermined rotation angle θ1. Thus, a rate of change of the output difference G7 relative to the rotation angle θ is greater than the output difference G3 of the third embodiment. The accelerator apparatus according to the seventh embodiment can readily detect an abnormality of the accelerator apparatus in a shorter time than in the third embodiment.

Eighth Embodiment

An accelerator apparatus according to an eighth embodiment will be described next with reference to FIG. 12A and FIG. 12B. The eighth embodiment is different from the seventh embodiment in that a relation between a first voltage and a second voltage is different from that of the seventh embodiment. Substantially the same parts as the third embodiment are designated by the same reference numerals to simplify the description.

Figure 12A:
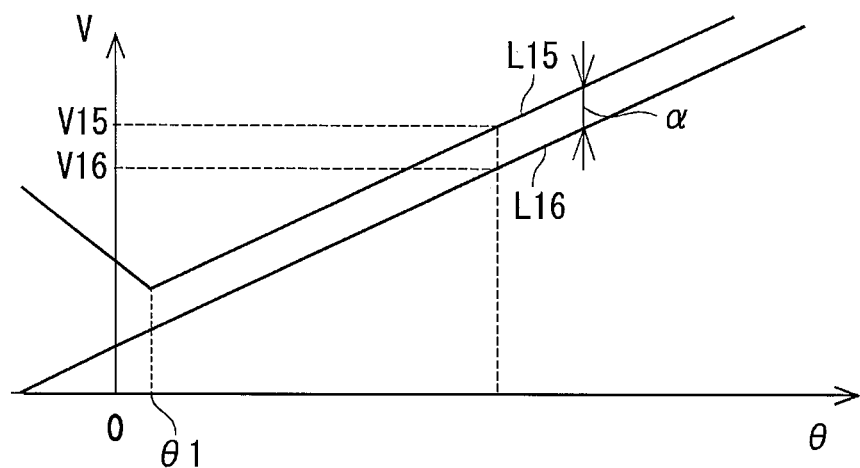
FIG. 12A and FIG. 12B are characteristic graphs showing relations among a rotation angle of a pedal, output voltages and an output difference in the accelerator apparatus according to an eighth embodiment.
Figure 12B:
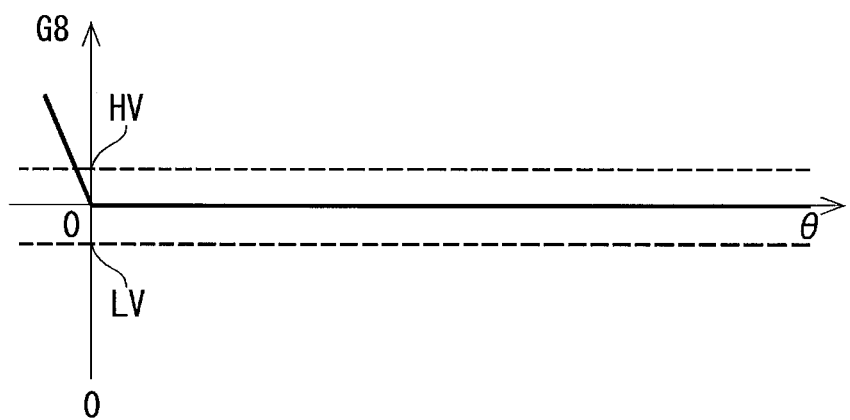

FIG. 12A shows a relation between a first voltage V15, a second voltage V16 and a rotation angle θ of a pedal 28. In FIG. 12A, a relation between the first voltage V15 and the rotation angle θ of the pedal 28 is indicated by a solid line L15 and a relation between the second voltage V16 and the rotation angle θ of the pedal 28 is indicated by a solid line L16. FIG. 12B shows a relation between an output difference G8, which is a voltage difference calculated from the first voltage V15 and the second voltage V16, and the rotation angle θ of the pedal 28.

In the accelerator apparatus according to the eighth embodiment, the DSPs 463 and 483 calculate respective output voltages so that the magnitude of the first voltage V15 is greater than the magnitude of the second voltage V16 by a predetermined value, which is an arbitrary value a for example as shown in FIG. 12A, at a rotation angle θ, which is equal to or greater than a predetermined rotation angle θ1. That is, the first voltage V15 and the second voltage V16 satisfy a relational expression, which is defined by the following equation (15).

$$V15 = V16 + a \quad (15)$$

The first voltage V15 corresponds to one output voltage (first output voltage) VA. The second voltage V16 corresponds to the other output voltage (second output voltage) VB.

In this case, the output difference G8 is defined by the following equation (16).

$$G8 = V15 - V16 - a \quad (16)$$

At the rotation angle θ, which is the predetermined angle θ1 or more, the output difference G8 is 0 and remains between the first threshold value HV and the second threshold value LV, that is, within the predetermined range. The ECU 49 determines that the rotation angle θ of the pedal 28 is normal.

When the rotation angle θ of the pedal 28 is less than the predetermined rotation angle θ1, the DSP 463 of the first Hall IC 46 sets the first voltage V15 to increase as the rotation angle θ of the pedal 28 decreases from the predetermined rotation angle θ1 as shown in, for example, FIG. 12A. That is, when the rotation angle θ is less than the predetermined rotation angle θ1, the first voltage V15 is different from a value calculated based on the relational expression defined by the equation (15). When the rotation angle θ of the pedal 28 is less than the predetermined rotation angle θ1, the output difference G8 calculated by the ECU 49 based on the equation (16) becomes greater than 0. In this case, when the rotation angle θ is between 0° and the predetermined rotation angle θ1, the output difference G8 remains between the first threshold value HV and the second threshold value LV. When the output difference G8 becomes equal to or greater than the first threshold value HV, the output difference G7 exceeds the predetermined range and the ECU 49 determines that the rotation angle θ is abnormal.

The accelerator apparatus according to the eighth embodiment determines that the rotation angle θ of the pedal 28 is abnormal when the output difference G8 calculated by the ECU 49 is equal to or greater than the first threshold value HV. Thus the accelerator apparatus according to the eighth embodiment provides the same advantage as the seventh embodiment.

Other Embodiments (a) In the first embodiment and the fifth embodiment, the first voltage is set to be twice as large as the second voltage at a rotation angle θ, which is an arbitrary rotation angle equal to or greater than 0°. In the third embodiment and the seventh embodiment, the first voltage is set to be twice as large as the second voltage at a rotation angle θ, which is an arbitrary rotation angle equal to or greater than θ1. In the second embodiment and the sixth embodiment, the first voltage is set to be larger than the second voltage by an arbitrary value a at a rotation angle θ, which is equal to or greater than 0°. In the fourth embodiment and the eighth embodiment, the first voltage is set to be larger than the second voltage by an arbitrary value a at a rotation angle θ, which is equal to or greater than 81. However the first voltage and the second voltage may be set differently from the above-described embodiments.

(b) In the above-described embodiments, the ECU determines that the rotation angle of the pedal is abnormal when the output difference is equal to or greater than the first threshold value. However, the ECU may determine abnormality of the rotation angle of the pedal differently. The rotation angle of the pedal may be determined to be abnormal when the output difference is equal to or less than the second threshold value. In this case, for example, in contrast to the first voltage decreasing in accordance with the rotation angle, the second voltage becomes a fixed value or becomes greater when the rotation angle is less than 0° or a predetermined rotation angle θ1 without satisfying a predetermined relational expression. Alternatively, in contrast to the first voltage decreasing relative to the rotation angle at a certain rate, the second voltage decreases at a higher rate.

(c) In the fifth embodiment to the eighth embodiment, the first voltage is set to increase without satisfying the relational expression, when the rotation angle is less than 0° or a predetermined rotation angle θ1. However, the first voltage may be set to change differently. The first voltage may decrease at a higher rate relative to the rotation angle than a rate of decreasing of the second voltage. In this case, the voltage difference becomes equal to or less than the second threshold value and hence the ECU can detect abnormality.

(d) In the above-described embodiments, the output difference is set to 0 as long as the rotation angle is normal. However, the output difference set to indicate that the rotation angle is normal may be set differently. It is only necessary that the output difference remains between the first threshold value and the second threshold value as long as the rotation angle is normal. In addition, the first threshold value and the second threshold value may be set arbitrarily.

(e) In the first embodiment and the second embodiment, the first voltage is set to a fixed value when the rotation angle is less than 0°. In the third embodiment and the fourth embodiment, the first voltage is set to a fixed value when the rotation angle is less than θ1. However, it may not be only the first voltage. The second voltage may be set to a fixed value in place of the first voltage, when the rotation angle is less than the above-described rotation angle.

(f) In the above-described embodiments, the accelerator apparatus is provided with two Hall ICs. However, the accelerator apparatus may be provided with other number of Hall ICs. It may be three or more.

(g) In the above-described embodiments, the magnets are provided in the sensor receiver of the shaft through the yoke. However, the magnets may be provided on the operation device, which rotates integrally with the shaft.

What is claimed is:

1. An accelerator apparatus comprising:
   a support device attachable to a vehicle chassis;
   a shaft supported rotatably by the support device;
   an operation device fixed to the shaft and rotatable to rotate the shaft integrally;
   a biasing device for biasing the shaft in an accelerator closing direction;
   a magnetism generation device for generating magnetic flux;
   plural magnetism detection devices for respectively outputting plural voltages varying with a change in magnetic flux density, which is caused by relative rotation against the magnetism generation device when the operation device is rotated; and
   an abnormality check device for checking whether a rotation angle of the operation device, which decreases when the operation device rotates in the accelerator closing direction, is abnormal based on the plural voltages outputted from the plural magnetism detection devices,
   wherein the plural magnetism detection devices include a first magnetism detection device and a second magnetism detection device for outputting a first output voltage and a second output voltage, respectively, based on a predetermined relational expression, which defines a relation between the first output voltage and the second output voltage when the rotation angle of the operation device is equal to or greater than a normal low limit value corresponding to a rest position of the operation device,
   wherein the first magnetism detection device outputs the first output voltage, which is different from the predetermined relational expression, when the rotation angle of the operation device is less than the normal low limit value, and
   wherein the abnormality check device determines that the rotation angle of the operation device is abnormal when a voltage difference between the first output voltage and the second output voltage is outside a predetermined range.

2. The accelerator apparatus according to claim 1, wherein:
   the first magnetic detection device fixes the first output voltage to a predetermined value, when the rotation angle of the operation device is less than the normal low limit value.

3. The accelerator apparatus according to claim 1, wherein:
   the predetermined relational expression is defined as $VA=VB\times2$, assuming that VA is the first output voltage and VB is the second output voltage.

4. The accelerator apparatus according to claim 1, wherein:
   the predetermined relational expression is defined as $VA=VB+\alpha$, assuming that VA is the first output voltage, VB is the second output voltage and α is a constant.

5. An accelerator apparatus comprising:
   a support device attachable to a vehicle chassis;
   a shaft supported rotatably by the support device;
   an operation device fixed to the shaft and rotatable to rotate the shaft integrally;
   a biasing device for biasing the shaft in an accelerator closing direction;
   a magnetism generation device for generating magnetic flux;
   plural magnetism detection devices for respectively outputting plural voltages varying with a change in magnetic flux density, which is caused by relative rotation against the magnetism generation device when the operation device is rotated; and an abnormality check device for checking whether a rotation angle of the operation device, which decreases when the operation device rotates in the accelerator closing direction, based on the plural voltages outputted from the plural magnetism detection devices, wherein the plural magnetism detection devices include a first magnetism detection device and a second magnetism detection device for outputting a first output voltage and a second output voltage, respectively, based on a predetermined relational expression, which defines a relation between the first output voltage and the second output voltage when the rotation angle of the operation device is equal to or greater than a predetermined rotation angle larger than a normal low limit value corresponding to a normal rest position of the operation device, wherein the first magnetism detection device outputs the first output voltage, which is different from the predetermined relational expression, when the rotation angle of the operation device is less than the predetermined rotation angle larger than the normal low limit value, and wherein the abnormality check device determines that the rotation angle of the operation device is abnormal when a voltage difference between the first output voltage and the second output voltage is outside a predetermined range.

6. The accelerator apparatus according to claim 5, wherein:
the voltage difference remains in the predetermined range when the rotation angle of the operation device is in a rotation angle between the normal low limit value and the predetermined rotation angle.

7. The accelerator apparatus according to claim 5, wherein:
the first magnetism detection device fixes the first output voltage to a predetermined value, when the rotation angle of the operation member is less than the predetermined rotation angle.

8. The accelerator apparatus according to claim 5, wherein:
the predetermined relational expression is defined as $VA=VB\times 2$, assuming that VA is the first output voltage and VB is the second output voltage.

9. The accelerator apparatus according to claim 5, wherein:
the predetermined relational expression is defined as $VA=VB+\alpha$, assuming that VA is the first output voltage, VB is the second output voltage and $\alpha$ is a constant.

* * * * *